Oct. 27, 1931.   E. W. BLANCHARD   1,829,183
PIPE THREADING MACHINE
Filed May 29, 1930
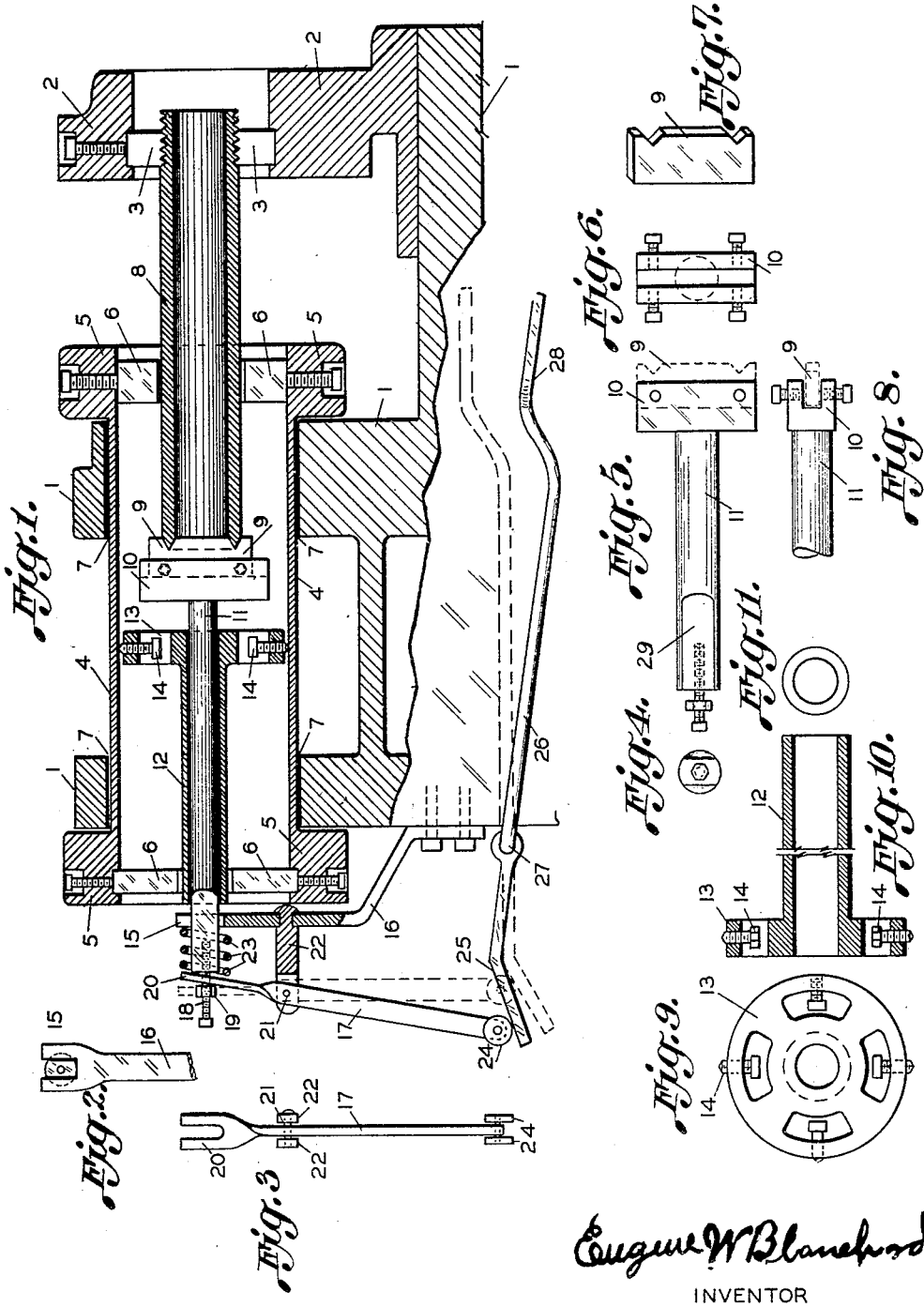

Patented Oct. 27, 1931

1,829,183

UNITED STATES PATENT OFFICE

EUGENE W. BLANCHARD, OF TULSA COUNTY, OKLAHOMA, ASSIGNOR OF ONE-HALF TO D. S. BOWERS, OF TULSA, OKLAHOMA

PIPE THREADING MACHINE

Application filed May 29, 1930. Serial No. 457,171.

My invention relates to the process of chamfering the end of a pipe nipple in a pipe threading machine and means for chamfering one end of the nipple while the other end is being threaded in said machine, and has for its object the reduction of machining operations and consequent reduction in the cost of making pipe nipples.

A further object of my invention is to provide such means in form adapted to be attached to the present well known type of pipe threading machines having a revolvably mounted drum or barrel bearing a chuck or chucks which hold the pipe while it is being threaded.

With the above stated and other objects in view which will appear as the description proceeds, my invention consists in the novel features hereinafter set forth in detail, illustrated in the accompanying drawings, and more particularly pointed out in the appended claims.

Referring to the drawings, in which numerals of like character designate similar parts thruout the several views:

Fig. 1 is a longitudinal cross-sectional view of the conventional type of pipe threading machine, showing only the important parts thereof with reference to my invention, and showing my invention thereon in place, and showing a pipe nipple in the machine with one end thereof being chamfered while the other end is being threaded.

Fig. 2 is a rear view of a forked member of my invention which prevents the bar which holds the chamfering bit from turning with the barrel of the machine.

Fig. 3 is a rear view of one of the levers used to engage and disengage the chamfering bit.

Fig. 4, comprising A, B, C, D, and E, is a view of parts of my invention, being of the bar holding the chamfering bit, and clamps therefor, and of the bit itself.

Fig. 5, comprising F, G, and H, is a view of parts of my invention, being of the means of holding the aforesaid bar in place in the drum or barrel of the machine.

In the drawings, 1 represents the frame of the machine, with part cut away as indicated. 2 represents the threading die head movably mounted on the machine in the usual manner and having threading dies 3 thereon for threading the pipe. 4 represents a drum or barrel open at both ends and which terminates in chucks 5 at each end, and with said chucks having jaws 6 to hold the pipe to be threaded in the machine. The drum 4 is revolvably mounted on the frame 1 and has its bearings thereon as indicated at 7, and is revolved in the usual manner, not shown. All of the above parts are of the well known type of pipe threading machine. Both chucks are used when the pipe is too long to be held by one chuck alone, but in threading pipe nipples only the front chuck next to the threading dies, is used as shown in the drawings.

To prepare the ends of the pipe nipples for threading, and to smooth the ends of the pipe and the inside of the pipe at the ends, it is necessary to chamfer the pipe at the ends. Heretofore this has been done as a separate process and in a separate machine, prior to putting the nipples in the threading machine to be threaded, where they are then threaded, one end at a time, in said machine.

I have provided on such a machine, means of chamfering the ends of a pipe nipple, chamfering one end and then turning the nipple end for end and chamfering the other end while at the same time threading the end first chamfered, and then turning the nipple end for end and threading the end last chamfered; or chamfering one end only of the nipple prior to putting the nipple in the machine, and chamfering the other end of the nipple while at the same time threading the end previously chamfered, then turning the nipple while at the same time threading end which has been chamfered in the pipe threading machine. The process of so making pipe nipples is new as is of course the means therefor, and results in a saving of time in manufacturing the nipples.

The means for so doing are attached to the machine above described, and set up therein as follows. In the barrel 4 I have provided to the rear of the front chuck in which the pipe nipple is held and on the opposite side thereof from the die head, a chamfering bit 9 held in a clamp 10 by set screws as indicated, on a round bar 11. The bar 11 is held in a housing 12 inserted in the drum 4 and held therein by the rear chuck of the machine and by a spider 13. The housing 12 is held centered in said drum by means of the jaws of the rear chuck and by means of the set screws 14 on said spider. The bar 11 is inserted into the housing 12, and for different length of nipples, a bar and housing of different length is used when the variation in length of the nipples make it impossible to adjust the die head the proper distance to permit of the insertion of the nipple and the threading and chamfering thereof between the threading dies and the chamfering bit.

The housing 12 revolves with the drum 4, but the bar 11 therein is stationary with reference to such revolution. The bar 11 is provided with a flat surface as at 29, being cut away on both sides as shown in the end view thereof at A of Fig. 4, and the flat portion thereof is slidably mounted in a fork 15 on a bracket 16 affixed to said machine. The bar 11 is free to move in the fork 15 longitudinally of the drum 4 in which it is axially positioned, but is prevented from revolving.

At the rear end of the bar 11 is provided a loose connection between the bar 11 and a lever 17, said connection being a bolt 18 and nut 19 on said bar and a fork 20 on said lever. The lever has a stationary fulcrum point 21 on a forked stationary member 22 attached to the bracket 16. The lever 17 is thus free to oscillate the bar 11 longitudinally of the drum 4, to engage and disengage the chamfering bit 9 with and from a nipple held in said machine. On the bar 11 and between the lever 17 on the flat face of its fork 20, and between the flat face of the stationary fork 15, is located a compression coil spring 23, which compresses when the bar is thrown forward and which throws the bar back when the lever 17 is released, thus engaging and disengaging the chamfering bit as aforesaid. The power point of the lever 17 is provided with a roller bearing or rollers 24 which bear on the inclined plane or surface 25 of a foot lever 26, said inclined plane being the variable weight bearing point of said foot lever which said lever has its fulcrum point 27 stationary and has its power point or end 28 conveniently located with reference to the machine to permit the operator of the machine to step on the foot lever at its end, which causes the rollers 24 to travel on the inclined plane 25 and to throw the fork 20 forward, and thus to cause the bar 11 to move forward and to thereby cause the chamfering bit 9 to engage the end of a nipple held in the machine. When the chamfering operation has been completed, the operator removes his weight from the foot lever 26, and the spring 23 throws the bar 11 back and releases the chamfering bit 9 from contact with the nipple.

It is obvious that the arrangement of levers employed to hold and reciprocate the bar 11 and to center it with the drum and keep it stationary therein, is merely one of a number of practical means for doing so, and I do not desire to be limited to the particular means shown in the drawings.

Having thus fully disclosed my invention and the process involved, what I claim and desire to secure by Letters Patent is:

1. The combination of a pipe threading machine adapted to thread pipe nipples, consisting of a revolvably mounted barrel having a chuck thereon for holding a pipe nipple to be threaded by said machine; a threading die adapted to engage and thread said nipple while the same is chucked in said machine; a chamfering bit located in said barrel and positioned at the opposite side of said chuck from where said threading die is located, and held stationary with reference to the revolution of said barrel; and means for moving said chamfering bit longitudinal of said barrel to cause said chamfering bit to engage and disengage one end of said pipe nipple while at the same time the other end of said pipe nipple may be threaded by said threading die.

2. An apparatus for chamfering the end of a pipe nipple and adapted to be attached to a pipe threading machine of the type having a revolvably mounted barrel bearing thereon a chuck in which the pipe is held while being threaded in said machine; and with said apparatus consisting of a chamfering bit mounted on a bar inserted into said barrel and held from revolving with said barrel; means for moving said chamfering bit longitudinally of said barrel to cause said chamfering bit to be advanced and withdrawn in and from contact with the end of a pipe nipple held in said chuck; and means of attaching said apparatus to said pipe threading machine.

In testimony whereof I affix my signature.

EUGENE W. BLANCHARD.